United States Patent [19]

Imanaka et al.

[11] Patent Number: 4,542,411

[45] Date of Patent: Sep. 17, 1985

[54] REDUNDANCY REDUCTION CODING METHOD OF MULTI-TONE PICTURE SIGNAL AND APPARATUS THEREFOR

[75] Inventors: Yoshifumi Imanaka; Yutaka Ueno, both of Amagasaki, Japan

[73] Assignee: Mitsubishi Denki Kabushiki Kaisha, Tokyo, Japan

[21] Appl. No.: 462,205

[22] Filed: Jan. 31, 1983

[30] Foreign Application Priority Data

Feb. 26, 1982 [JP] Japan .................................. 57-31984

[51] Int. Cl.$^4$ .......................... H04N 1/00; H04N 7/12
[52] U.S. Cl. .................................... 358/260; 358/133; 382/56
[58] Field of Search ....................... 358/133, 138, 260; 381/29, 30; 382/56

[56] References Cited

U.S. PATENT DOCUMENTS

| | | | |
|---|---|---|---|
| 4,133,006 | 1/1979 | Iinuma | 358/133 |
| 4,190,861 | 2/1980 | Lux | 358/135 |
| 4,325,085 | 4/1982 | Gooch | 358/261 |

*Primary Examiner*—Howard W. Britton
*Assistant Examiner*—John K. Peng
*Attorney, Agent, or Firm*—Lowe King Price & Becker

[57] ABSTRACT

A redundancy reduction coding method of a multi-tone picture element comprises the steps of selecting reference picture elements from picture elements already scanned and transmitted, selecting a single reference picture element as a base reference element and then evaluating a plurality of first tone level differences between the base reference picture element and the reference picture elements other than the base reference picture element and a second tone level difference between the base reference picture element and an objective picture element to be transmitted. Then, if and when all of the tone level differences are within a predetermined region, the second tone level difference is converted into a predictive order in which a second tone level difference appears for a particular combination of the plurality of first tone level differences, the predictive order being produced in advance based on statistics of a standard picture. Thereafter, the predictive order is converted into a predetermined assigned code. The code is a variable length code in which a shorter code is assigned to a higher rank of the predictive order.

6 Claims, 12 Drawing Figures

REDUNDANCY REDUCTION CODING METHOD OF MULTI-TONE PICTURE SIGNAL AND APPARATUS THEREFOR

BACKGROUND OF THE INVENTION

1. Field of the Invention

The present invention relates to a coding method and, more particularly, relates to a redundancy reduction coding method capable of largely reducing an amount of data required for transmission or storage of multi-tone picture.

2. Description of the Prior Art

Figure 1:
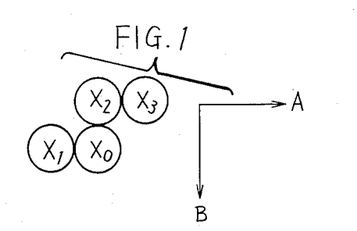
FIG. 1 is an explanatory drawing showing an objective picture element $X_0$ now to be transmitted and reference picture elements $X_1-X_3$ selected from picture elements already coded and transmitted.

Conventionally, this kind of coding method includes a linear predictive coding method. FIG. 1 is a drawing showing an objective picture element $X_0$ to be transmitted and reference picture elements $X_1-X_3$ selected from picture elements already coded and transmitted. In the figure, A denotes a main scanning direction and B denotes a sub scanning direction. Let it be assumed that the tone levels of the picture elements in FIG. 1 are $x_0$, $x_1$, $x_2$ and $x_3$, respectively, a predictive value $\hat{x}_0$ of the objective picture element of $X_0$ provided by a linear predictive function in the following equation (1), for example, has been well known to provide a relatively excellent prediction.

$$\hat{x}_0 = \frac{1}{2}\left(x_1 + \frac{x_2 + x_3}{2}\right) \quad (1)$$

In the linear predictive coding method, a difference value (referred to as a predictive error) between the predictive value $\hat{x}_0$ of the objective picture element evaluated using the above described predictive function and an actual value $x_0$ of the objective picture element is evaluated and the evaluated difference value is coded and transmitted. As a matter of course, a pattern of distribution of the difference values indicates a mountain-shape having a peak at 0. Accordingly, data compression becomes possible by performing a coding in which a short code word is assigned with respect to a difference value near 0 using a variable length code.

Figure 2:
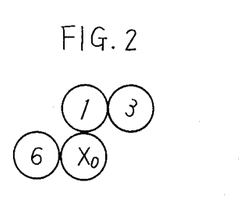
FIG. 2 shows an example of tone levels of the reference picture elements.

Meanwhile, in a conventional linear predictive coding method, a detailed statistic nature of a picture is not necessarily and fully considered and hence there is some possibility that efficiency of coding is reduced depending on a situation. For example, let it be assumed that in a picture of 32 tones, the tone levels of the reference picture elements $X_1-X_3$ as shown in FIG. 2 are 6, 1 and 3, respectively. At that time, the distribution of the tone level $x_0$ of the objective picture element is considered a two-peak type having two peaks at 1 and 6. More particularly, the most likely value of $x_0$ is 1 or 6. On the other hand, in this case, the predictive value $\hat{x}_0$ evaluated from the linear predictive function of the equation (1) is 4. Thus, a predictive error becomes larger and hence an effective redundancy reduction coding cannot be made.

SUMMARY OF THE INVENTION

The present invention is directed to a redundancy reduction coding of a multi-tone picture signal for eliminating drawbacks of the above described conventional linear predictive coding method. The present invention is based on the statistical fact that a tone level of neighboring picture elements with respect to each other is distributed within a certain region with respect to each other in a general multi-tone picture.

A coding method in accordance with the present invention comprises the steps of selecting as reference picture elements picture elements of a predetermined combination from the picture elements already scanned and transmitted and selecting as a base reference picture element a single reference picture element therefrom; evaluating a plurality of first tone level differences between each of all the reference picture elements other than the base reference picture element and a tone level of the base reference picture element; evaluating a second tone level difference between a tone level of an objective picture element now to be transmitted and a tone level of the base reference picture element; and, responding to the plurality of first tone level differences and the second tone level difference to determine that a particular mode is a mode-1 if all of the plurality of first tone level differences and the second tone level difference are included in a predetermined region and that a particular mode is a mode other than a mode-1 if the first tone level differences and the second tone level difference are not included in the region. In the mode 1, an order in which the second tone level difference appears for each of a plurality of picture states represented by a combination of the plurality of first tone level differences is evaluated; the second tone level difference is converted to a predictive order; and the predictive order is converted into a predetermined assigned code. In the mode other than the mode 1, a tone level of the objective picture element is coded by means of a predetermined appropriate coding method.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First, a basic principle of the present invention will be described. Let it be assumed that $X_1$ is selected as a base reference picture element from reference picture elements $X_1$–$X_3$ in FIG. 1. Then, tone level differences between other reference picture elements $X_2$, $X_3$ and an objective picture element $X_0$, and the base reference picture element $X_1$, that is, $d_2 = x_2 - x_1$, $d_3 = x_3 - x_1$, $d_0 = x_0 - x_1$, are evaluated. Thereafter, one of the following three modes are selected by comparing the values of $d_2$, $d_3$ and $d_0$ with predetermined values $w_1$ ($<0$) and $w_2$ ($>0$).

(i) In case of $w_1 \leq d_2 \leq w_2$, $w_1 \leq d_3' w_2$ and $w_1 \leq d_0 \leq w_2$ (mode 1)

In this case, the value $d_0$ is converted into a predictive order by referring to only $d_2$ and $d_3$ and then the predictive order is coded. More particularly, the number of picture states determined by $d_2$ and $d_3$ is (the number of $d_2$ states)×(the number of $d_3$ states), that is, $(W_2 - W_1 = 1)^2$. Then, for each of these picture states, an order in which $d_0$ ($w_1 \leq d_0 \leq w_{22}$) appears is predicted based on the statistical amount of a model standard picture such as SIDBA described subsequently. Next, for example, when $d_0$ actually appears in the i-th predictive order ($1 \leq i \leq w_2 - w_1 + 1$) in a certain picture state ($d_2$, $d_3$), the $d_0$ is converted into i and then is coded. For coding a predictive order, a short code word is assigned to the higher rank of the predictive order. In the simplest example, the code "1" is assigned to the first predictive order, the code "01" is assigned to the second predictive order, the code "001" to the third predictive order, ... and so on. Since in most cases, $d_0$ is expected to appear in a higher rank of predictive order, an effective redundancy reduction is achieved.

(ii) In case of $w_1 \leq d_2 \leq w_2$ and $w_1 \leq d_3 \leq w_2$, but $d_0 < w_1$ or $d_0 < w_2$ (mode 2)

In this case, for example, if and when $d_0 > w_2$, ($d_0 - w_2$) can be coded and if and when $d_0 < w_1$, ($d_0 - w_1$) can be coded.

(iii) In case of $d_2 < w_1$ or $d_2 > w_2$, or $d_3 < w_1$ or $d_3 >_{w2}$ (mode 3)

In this case, for example, a predictive value $x_0$ of $x_0$ is evaluated using a linear predictive function in the equation (1) and thus the predictive error ($x_0 - \hat{x}_0$) can be coded.

In the foregoing, it is considered that the rate of data compression which is a whole picture average can be enhanced by appropriately selecting $w_1$ and $w_2$, since the number of picture elements belonging to the mode 1 considerably increases as compared with the number of picture elements belonging to the mode 2 or 3 and the rate of data compression by means of conversion of a predictive order in the mode 1 is higher.

Now in order to see quantitatively the effect of the data compression in accordance with the present invention, an entropy which serves as an index indicative of a theoretical limit of the compression will be considered. The entropy based on a linear prediction in the equation (1) is given by the following equation (2).

$$H_1 = \sum_{(x_0 - \hat{x}_0)} - P(x_0 - \hat{x}_0) \cdot \log_2 P(x_0 - \hat{x}_0) \quad (2)$$

(bits/picture element)

On the other hand, the entropy in accordance with the present invention is evaluated in three modes. First, a conditional entropy $h_1$ in the mode 1 is given by the following equation (3).

$$h_1 = \sum_{d_0 = w_1}^{w_2} \sum_{d_2 = w_1}^{w_2} \sum_{d_3 = w_1}^{w_2} - P(d_0, d_2, d_3) \cdot \log_2 P(d_0/d_2, d_3) \quad (3)$$

(bits/picture element)

In this equation (3), $P(d_0, d_2, d_3)$ indicates a probability of combination and $P(d_0/d_2, d_3)$ indicates a conditional probability. A conditional entropy $h_2$ in the mode 2 is given by the following equation (4).

$$h_2 = \sum_{d_0 - w_2; d_0 > w_2} - P(d_0 - w_2) \cdot \log_2 P(d_0 - w_2) + \quad (4)$$

$$\sum_{d_0 - w_1; d_0 < w_1} - P(d_0 - w_1) \cdot \log_2 P(d_0 - w_1)$$

(bits/picture element)

A conditional entropy $h_3$ in the mode 3 is given by the following equation (5).

$$h_3 = \sum_{\substack{d_0 > w_2 \\ d_0 < w_1}} - P(x_0 - \hat{x}_0) \cdot \log_2 P(x_0 - \hat{x}_0) \quad (5)$$

(bits/picture element)

In addition, as described subsequently, if and when a particular mode belongs to the mode 1 or the mode 2, then additional information is required for identifying which mode of the two modes the particular mode belongs to, the entropy $h_S$ for the additional information being given by the following equation (6).

$$h_S = - \frac{P_1}{P_1 + P_2} \log_2 \frac{P_1}{P_1 + P_2} - \frac{P_2}{P_1 + P_2} \log_2 \frac{P_2}{P_1 + P_2} \quad (6)$$

(bits/picture element)

In the equation (6), $p_i$ ($i = 1, 2, 3$) is the probability in the mode i, where $p_1 + p_2 + p_3 = 1$. Eventually, an average entropy $H_t$ per single picture element in accordance with the present method is given by the following equation (7).

$$H_t = P_1 \cdot h_1 + P_2 \cdot h_2 + P_3 \cdot h_3 + (P_1 + P_2) \cdot h_S \quad (7)$$

The following were illustratively selected as an objective picture for coding: GIRL in number 1, AERIAL in number 11 and FACS DATA in number 12 from SIDBA (Standard Image Data Base) provided by Institute of Industrial Science in Tokyo University. These were considered as tone pictures of 8 bits/picture element, 6 bits/picture element and 4 bits/picture element and then the entropy was measured in accordance with the linear predictive function in the equation (1) and in accordance with the present method, respectively. The result thereof is listed in the following table.

|  |  | tone | | |
|---|---|---|---|---|
| picture | method | 8 bits/ picture element | 6 bits/ picture element | 4 bits/ picture element |
| No. 1 GIRL | linear predictive $H_l$ | 4.795 | 2.876 | 1.418 |

-continued

| picture | method | tone | | |
|---|---|---|---|---|
| | | 8 bits/ picture element | 6 bits/ picture element | 4 bits/ picture element |
| | the present method $H_t$ | 4.548 | 2.598 | 1.077 |
| No. 11 AERIAL | linear predictive $H_l$ | 5.917 | 3.937 | 2.124 |
| | the present method $H_t$ | 5.751 | 3.665 | 1.833 |
| No. 12 FACS DATA | linear predictive $H_l$ | 4.223 | 2.815 | 1.903 |
| | the present method $H_t$ | 3.443 | 2.038 | 1.204 |

In this case, $w_1 = -8$, $w_2 = 7$ are set. It can be seen from the result of the table that the entropy in accordance with the coding method of the present invention is smaller than that in the coding method in accordance with the conventional linear prediction and particularly, the present method indicates a remarkable enhancement of the rate of data compression with respect to a picture of low tone such as 4 bits/picture element and a picture close to a binary state such as FACS DATA picture.

Figure 3:
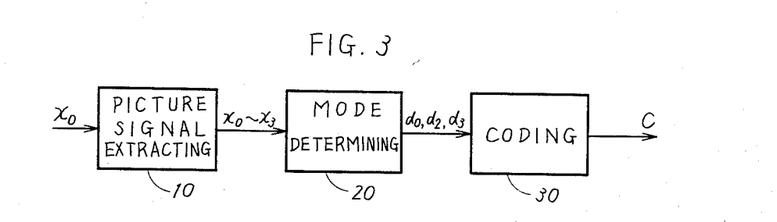
FIG. 3 is a schematic block diagram showing a preferred embodiment of a coding apparatus in accordance with the present invention.
Figure 4:
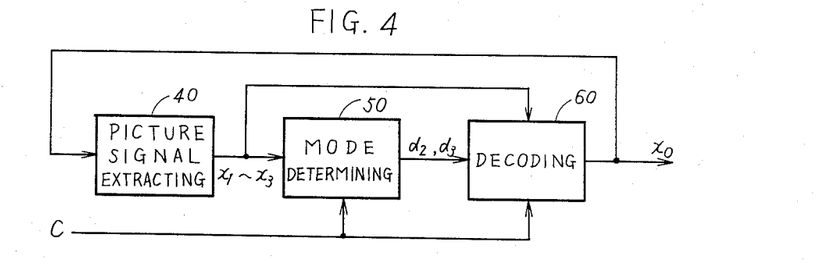
FIG. 4 is a schematic block diagram showing a preferred embodiment of a decoding apparatus in accordance with the present invention.

Now referring to FIGS. 3 to 12, a preferred embodiment for implementing the basic principle of the present invention as described in the foregoing will be described. FIGS. 3 and 4 are schematic diagrams showing a preferred embodiment of an entire apparatus and a decoding apparatus, respectively, in accordance with the present invention. As shown in FIG. 3, the coding apparatus in accordance with the present invention comprises a picture signal extracting portion 10 for extracting picture signals $x_0-x_3$ (that is, the tone levels of the picture elements $X_0-X_3$), a mode determining portion 20 for determining or selecting one of three coding modes by referring to the extracted picture signals $x_0-x_3$, and a coding portion 30 for coding a picture signal $x_0$ into a code C in the selected coding mode. Although the details of each portion will be described subsequently, a brief description of operation of each portion will be provided. The picture signal extracting portion 10 includes a plurality of delay circuits and extracts four picture signals $x_0-x_3$ as shown in FIG. 1. The mode determining portion 20 evaluates $d_2 = x_2 - x_1$, $d_3 \times x_3 - x_1$ and $d_0 = x_0 - x_1$, respectively, by referring to the extracted picture signals $x_0-x_3$. The mode determining portion also includes three region identifying portions and determines a particular coding mode by identifying $w_1 \leq d_2 \leq w_2$, $w_1 \leq d_3 \leq w_2$, and $w_1 \leq d_0 \leq w_2$. The coding portion 30 codes the picture signal $x_0$ into a code C in accordance with the determined mode.

As shown in FIG. 4, the decoding apparatus in accordance with the present invention comprises a picture signal extracting portion 40 for extracting picture signals $x_1-x_3$ from the decoded picture signals, a mode determining portion 50 for making a mode selection by referring to the extracted picture signals $x_1-x_3$ and the applied code input C, and a decoding portion 60 for decoding the code input C into the picture signal $x_0$ in accordance with the selected mode. A brief description of operation of each portion will be provided, although the detail of each portion will be described subsequently. The picture signal extracting portion 40 includes a plurality of delay circuits and extracts three picture signals $x_1-x_3$ as shown in FIG. 1 from the already decoded picture signals. The picture signal $x_0$ to be decoded is applied as a code input C. The mode determining portion 50 evaluates $d_2 = x_2 - x_1$, $d_3 = x_3 - x_1$ by referring to the extracted picture signals $x_1-x_3$. The mode determining portion 50 also includes two region identifying portions which identify $w_1 \leq d_2 \leq w_2$ and $w_1 \leq d_3 \leq w_2$, respectively. Through the identification, the selection of the mode 3 becomes possible. The selection of the mode 1 or 2 is made by referring to the code input C. The decoding portion 60 decodes the code input C into the picture signal $x_0$ in accordance with the selected mode.

Figure 5:
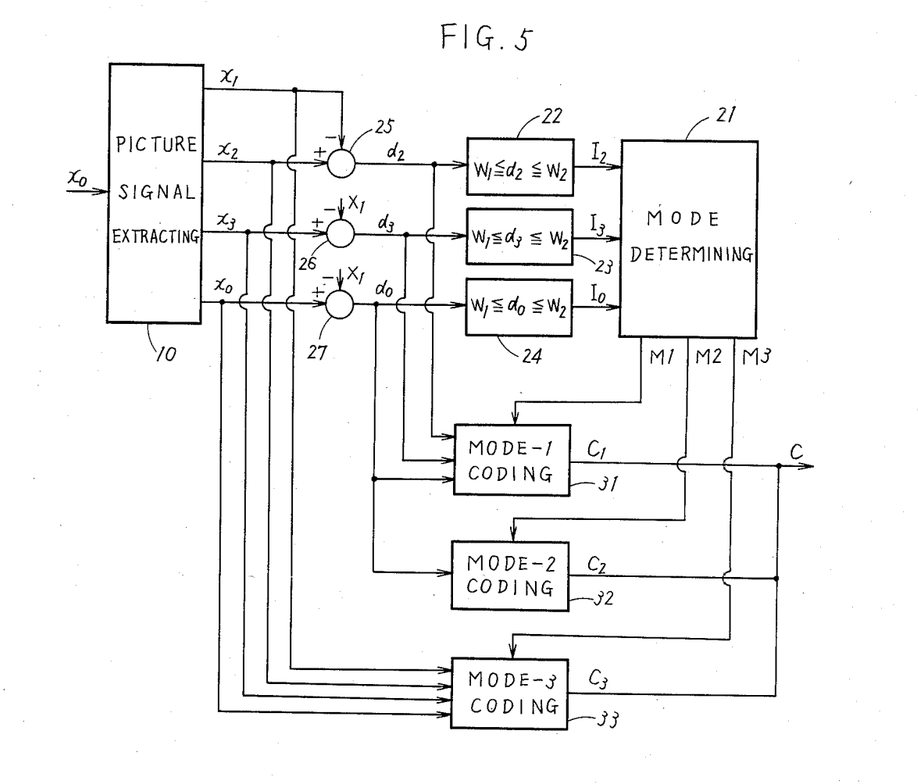
FIG. 5 is a block diagram showing in detail a preferred embodiment of the coding apparatus in accordance with the present invention.
Figure 6:
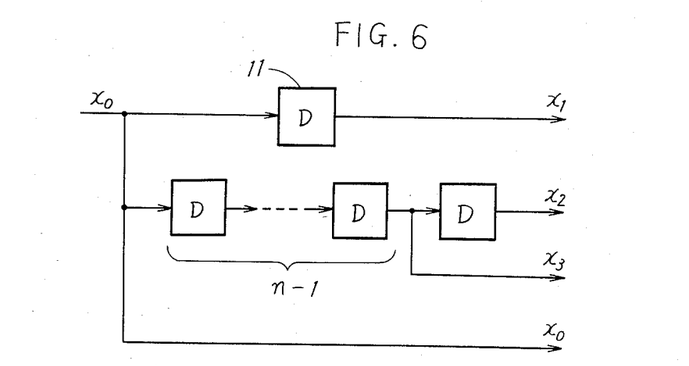
FIG. 6 shows in detail a picture signal extracting circuit 10 in FIG. 5.
Figure 7:
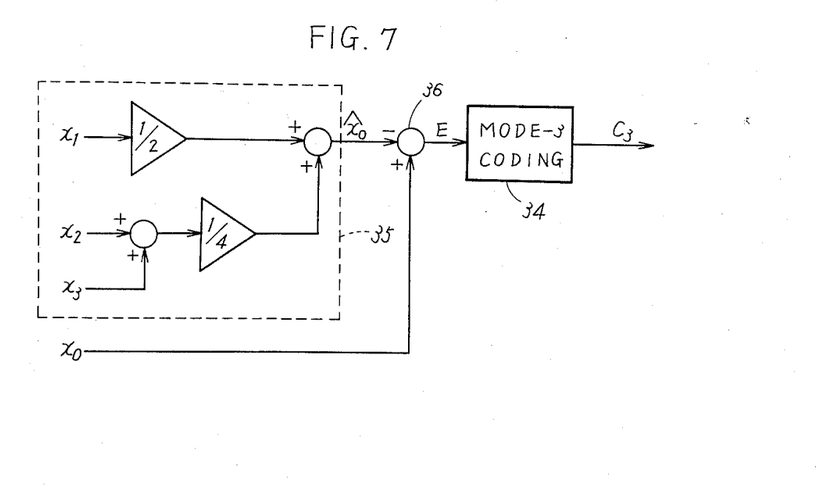
FIG. 7 shows in detail a mode-3 coding portion 33 in FIG. 5.

Now turning to FIGS. 5 to 7, a preferred embodiment of a coding apparatus in accordance with the present invention as shown in FIG. 3 will be described in detail. FIG. 5 is a block diagram showing in detail a preferred embodiment of a coding apparatus in accordance with the present invention. FIGS. 6 and 7 show a picture signal extracting circuit 10 and a mode-3 coding portion 33 in FIG. 5, respectively.

The picture signal extracting circuit 10 includes a plurality of delay circuits 11, as shown in FIG. 6, each of the delay circuits operating to delay an applied picture signal by a single picture element. The picture signal $x_0$ applied to the picture signal extracting circuit 10 is extracted as a picture signal $x_1$ through one delay circuit, as a picture signal $x_2$ through n delay circuits (wherein n is the number of picture elements included in a scan line), as a picture signal $x_3$ (n−1) delay circuits, and directly as a picture signal $x_0$.

With respect to the extracted picture signal $x_0-x_3$, arithmetic units 25, 26 and 27 perform the following operation. More particularly, $(x_2 - x_1)$ is evaluated in the arithmetic unit 25, $(x_3 - x_1)$ is evaluated in the arithmetic unit 26, and $(x_0 - x_1)$ is evaluated in the arithmetic unit 27. These evaluated results indicate the tone level differences between the base reference picture element $X_1$ and the reference picture elements $X_2$, $X_3$ and an objective picture element $X_0$, respectively, which are handled as the tone level difference signals $d_2$, $d_3$ and $d_0$, respectively.

The respective region identifying devices 22, 23 and 24 receive the respective tone level difference signals $d_2$, $d_3$ and $d_0$ and identify whether the received signals are between predetermined values $w_1(<0)$ and $w_2(\leq 0)$. More particularly, the region identifying device 22 identifies whether the signal $d_2$ is between $w_1$ and $w_2$ and, in case of $w_1 \leq d_2 \leq w_2$, applies a binary signal $I_2$ which is logically true. The region identifying device 23 identifies whether the signal $d_3$ is between $w_1$ and $w_2$, and, in case of $w_1 \leq d_3 \leq w_2$, applies a binary signal $I_3$ which is logically true. The region identifying device 24 identifies whether the signal $d_0$ is between $w_1$ and $w_2$, and, in case of $w_1 \leq d_0 \leq w_2$, applies a binary signal $I_0$ which is logically true.

The mode determining portion 21 receives these binary signals $I_2$, $I_3$ and $I_0$ and determines a particular mode for coding as described subsequently.
(i) In case where $I_2$, $I_3$, and $I_0$ are all true;
  mode 1, a mode-1 coding portion enabling signal M1 is applied.
(ii) In case where $I_2$ and $I_3$ are true and $I_0$ is false;
  mode 2, a mode-2 coding portion enabling signal M2 is applied.
(iii) In case where $I_2$ is false or $I_3$ is false;
  mode 3, a mode-3 coding portion enabling signal M3 is applied.

In this way, the mode determining portion 21 applies the coding portion enabling signal M1, M2 or M3 corresponding to the determined mode.

The coding portion enabling signal M1 enables the mode-1 coding portion 31. The mode-1 coding portion 31 receives the signals $d_2$, $d_3$ and $d_0$ and applies a code output $C_1$ which is a coded signal of $d_0$. Since the principle for coding was already described in the foregoing, a specific preferred example thereof will be described. The mode-1 coding portion 31 preferably includes a code table. An identification of a code in the code table is uniquely made in response to the signals $d_2$, $d_3$ and $d_0$. The total number of the codes in the table is represented by a product of the number of picture states determined by the $d_2$ and $d_3$ and the number of predictive orders of $d_0$ for each picture state, that is, $(w_2-w_1+1)^3$. However, the number of the codes necessary for assignment is not $(w_2-w_1+1)^3$, but only $(w_2-w_1+1)$, because the same code is assigned to the same predictive order with respect to any picture states. As described in the foregoing, in the simplest example, a code is assigned for each picture state such as "1" is assigned to the first predictive order, "01" is assigned to the second predictive order, "001" is assigned to the third predictive order and so on. The mode-1 coding portion 31 receives the tone level difference signals $d_2$, $d_3$ and $d_0$ and applies the code output $C_1$ which is a coded signal of $d_0$, using the code table.

The coding portion enabling signal M2 enables the mode-2 coding portion 32. The mode-2 coding portion 32 receives the signal $d_0$ and applies a code output $C_2$ which is a coded signal of the signal $d_0$. Preferably, the coding is made with respect to $(d_0-w_2)$ or $(d_0-w_1)$, as described in the foregoing. $(d_0-w_2)$ or $(d_0-w_1)$ provides a value which is not within a predetermined region from $w_1$ to $w_2$. More specifically, the mode-2 coding porion 32 preferably includes a code table. The identification of code in the table is uniquely made in response to the signal $d_0$. The code assigned to the value $(d_0-w_2)$ or $(d_0-w_1)$ may be the same as that in the mode-1. In this case, identifying codes for identifying the mode 1 and the mode 2 are required to be added to the code outputs $C_1$ and $C_2$. For example, in a simple example, an identifying code 0 for identifying the mode 1 may be added to the top of the code output $C_1$ and an identifying code 1 for identifying the mode 2 may be added to the top of the code output $C_2$.

In order to facilitate the understanding of the explanation, let it be assumed that $w_1 = -7$ and $w_2 = 8$. In this case, the codes may be assigned in the following, for example, "1" is assigned to $d_{0-w1} = -1$ (that is, $d_0 = 9$), "01" is assigned to $d_0 - w_1 = -1$ (that is, $d_0 = -8$), "001" is assigned to $d_0 = -w_2 = 2$ (that is, $d_0 = 10$), "0001" to $d_0 - w_1 = -2$ ($d_0 = -9$), "00001" to $d_0 - w_2 = 3$ ($d_0 = 11$), and so on. Alternatively, a code which is not overlapped with the mode 1 may be assigned. In this case, a mode identifying code is not required. For example, in the simplest example, if and when a code assignment to the mode 1 is completed at "00000001", then a code "000000001" and codes subsequent thereto can be assigned to the value $(d_0-w_1)$ or $(d_0-w_2)$ which is not within a predetermined region in the mode 2. The mode-2 coding apparatus 32 receives the signal $d_0$ and applies to a code output $C_2$ which is a coded signal of the $d_0$ using such code table.

A coding portion enabling signal M3 enables a mode-3 coding portion 33. The mode-3 coding portion 33 is shown in detail in FIG. 7 and receives the picture signals $x_0$-$x_3$ to make a conventional linear predictive coding. In FIG. 7, a predicting apparatus 35 enclosed in a dotted line receives the picture signals $x_1$-$x_3$ to evaluate $\frac{1}{2}\{x_1+\frac{1}{2}(x_2+x_3)\}$ and hence applies a linear predictive value $\hat{x}_0$. Then, an arithmetic unit 36 receives the picture signal $x_0$ and a predictive value $\hat{x}_0$ and evaluates a predictive error $(x_0-\hat{x}_0)$. Thereafter, an appropriate coding using a variable length code is made in the mode-3 coding apparatus 34 for the predictive error $(x_0-\hat{x}_0)$ and a code output $C_3$ is provided.

Figure 8:
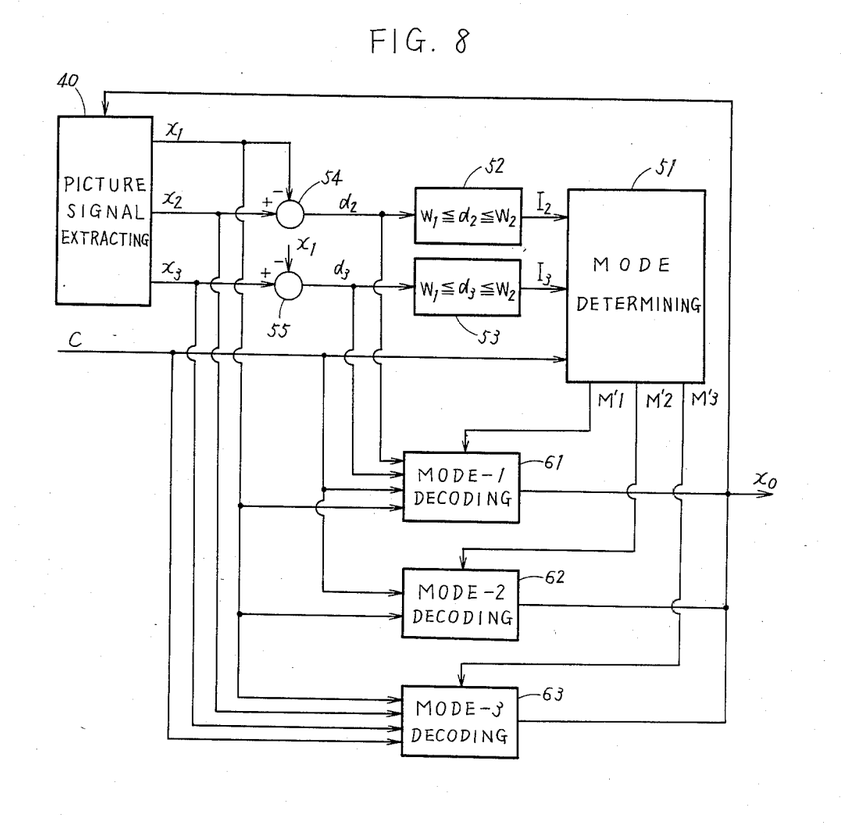
FIG. 8 is a block diagram showing in detail a preferred embodiment of the decoding apparatus in accordance with the present invention.

Now turning to FIGS. 8 to 12, a preferred embodiment of a decoding apparatus in accordance with the present invention, as shown in FIG. 4, will be described in detail. FIG. 8 is a block diagram showing in detail a preferred embodiment of a decoding apparatus in accordance with the present invention. FIGS. 9 to 12 show a picture signal extracting circuit 40, a mode-1 decoding portion 61, a mode-2 decoding portion 62 and a mode-3 decoding portion 63 in FIG. 8, respectively.

Figure 9:
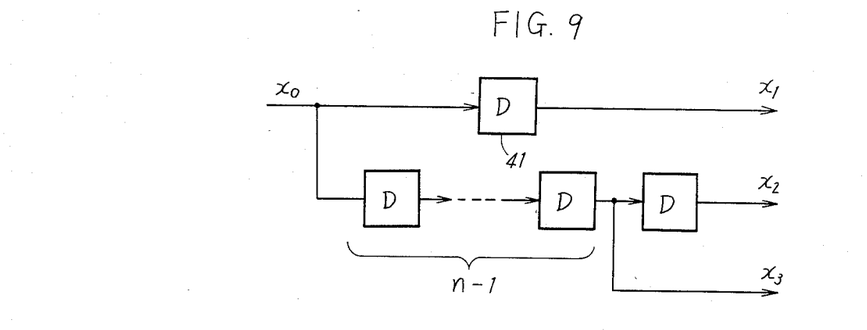
FIG. 9 shows in detail a picture signal extracting circuit 40.

The picture signal extracting circuit 40 includes a plurality of delay circuits 41 as shown in FIG. 9. Each of the delay circuits operates to delay the applied picture signal by a picture element. The picture signal $x_0$ applied to the picture signal delay circuit 40 is outputted as a picture signal $x_1$ through one delay circuit, as a picture signal $x_2$ through n delay circuits and as a picture signal $x_3$ through $(n-1)$ delay circuits.

With respect to these picture signals $x_1 \sim x_3$, an arithmetic unit 54 evaluates $(x_2-x_1)$ which corresponds to a tone level difference signal $d_2$ and an arithmetic unit 55 evaluates $(x_3-x_1)$ which corresponds to a tone level difference signal $d_3$. The region identifying apparatus 52 receives the signal $d_2$ and identifies whether the signal $d_2$ is between $w_1$ and $w_2$, and, if $w_1 \leq d_2 \leq w_2$, applies a binary signal $I_2$ which is logically true. The region identifying apparatus 53 receives the signal $d_3$ to identify whether the signal $d_3$ is between $w_1$ and $w_2$ and applies a binary signal $I_3$ which is logically true, if $w_1 \leq d_3 \leq w_2$.

The mode determining portion 51 receives the binary signals $I_2$, $I_3$ and a code input C and determines a particular mode for decoding in the following manner.

(i) In case where $I_2$ is false or $I_3$ is false, a mode is the mode 3.
 a mode-3 decoding portion enabling signal M'3 is applied.

(ii) In case where $I_2$ is true and $I_3$ is true, a mode is the mode 1 or the mode 2. In this case, the mode identification is made by referring to the code input C.

For example, in case where an identifying code for identifying a mode is added as described in the foregoing, it is identified whether the code input C is in the mode 1 or in the mode 2 by referring to the identifying code. Then, a corresponding decoding portion enabling signal M'1 or M'2 is applied.

In addition, in case where a code which is not overlapped with respect to a mode 1 and a mode 2 is assigned as described in the foregoing, a mode identification is not needed. In this case, the mode-1 decoding portion enabling signals M'1 and the mode-2 decoding portion enabling signal M'2 are applied and hence both of the mode-1 decoding portion 61 and the mode-2 decoding portion 62 are enabled.

Figure 10:
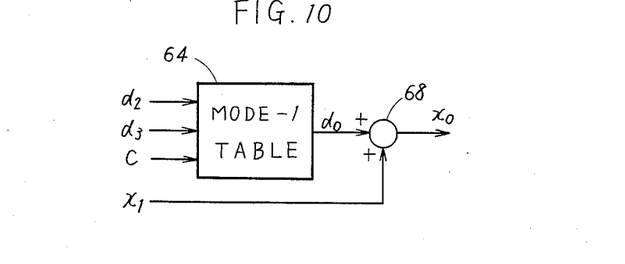
FIG. 10 shows in detail a mode-1 decoding portion in FIG. 8.

The decoding portion enabling signal M'1 enables the mode-1 decoding portion 61. The mode-1 decoding portion receives the tone level difference signals $d_2$, $d_3$, a picture signal $x_1$ and a code input C and applies a picture signal $x_0$ which is a decoded output of a code input C. As shown in FIG. 10, the mode-1 decoding portion 61 preferably includes a picture signal table 64. The identification of a picture signal in the picture signal table 64 is uniquely made using the tone level difference signals $d_2$, $d_3$ and a code input C. The picture signal table 64 applies a tone level difference signal $d_0$ corresponding to the code input C in response to the tone level difference signals $d_2$, $d_3$ and the code input C, which could be easily understood since these operations are reversed relative to the above described coding. Then, an arithmetic unit 68 evaluates $(d_0+x_1)$ in response to the tone level difference signal $d_0$ and the picture signal $x_1$. As described in the foregoing, $d_0$ is equal to $(x_0-x_1)$, and hence $(d_0+x_1)$ is equal to $(x_0)$. Thus, the mode-1 decoding portion 61 applies a corresponding signal $x_0$ in response to the code input C.

Figure 11:
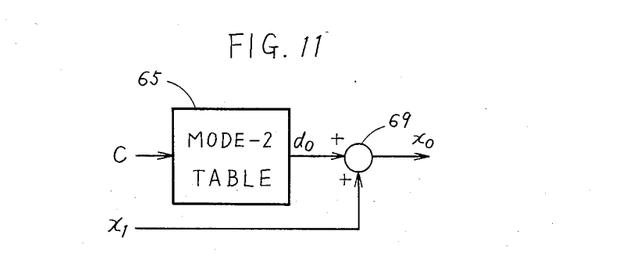
FIG. 11 shows in detail a mode-2 decoding portion in FIG. 8.

The decoding portion enabling signal M'2 enables the mode-2 decoding portion 62. The mode-2 decoding portion 62 receives the code input C and the picture signal $x_1$ and applies a picture signal output $x_0$ corresponding to the code input C. As shown in FIG. 11, the mode-2 decoding portion 62 preferably includes a picture signal table 65. The identification of a picture signal in the picture signal table 65 is uniquely made using the code input C. The picture signal table 65 receives a code input C and applies the tone level difference signal $d_0$ corresponding to the code input C. This could be easily understood since such operation is reversed relative to the above described coding. Then, an arithmetic unit 69 evaluates $(d_0+x_1)$, that is, $x_0$, in response to the tone level difference signal $d_0$ and a picture signal $x_1$. Thus, the mode-2 decoding portion 62 applies a corresponding picture signal $x_0$ in response to the coding input C.

As described in the foregoing, when the codes which are not overlapped with respect to each other are applied to the mode 1 and the mode 2, respectively, the mode-1 decoding portion 61 and the mode-2 decoding portion 62 are simultaneously enabled. However, even in this case, an inconvenience never entirely occurs in which corresponding tone level difference signals $d_0$ are outputted from both tables at the same time, since the code in the mode 1 and the code in the mode 2 are not overlapped with respect to each other.

Figure 12:
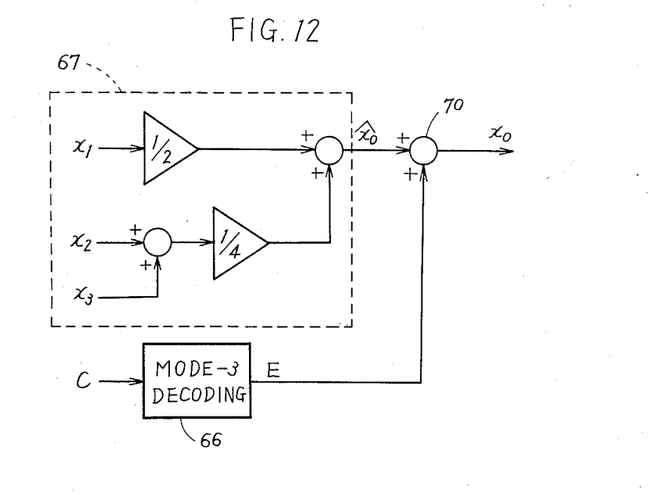
FIG. 12 shows in detail a mode-3 decoding portion in FIG. 8.

The decoding portion enabling signal M'3 enables a mode-3 decoding portion 63. The mode-3 decoding portion 63 receives the picture signals $x_1 \sim x_3$ and the code input C coded by means of a conventional linear predictive coding method and applies a picture signal $x_0$ corresponding to the code input C. FIG. 12 shows in detail a mode-3 decoding portion 63. A predicting apparatus 67 enclosed in a dotted line evaluates $\frac{1}{2}\{x_1+\frac{1}{2}(x_2+x_3)\}$ in response to the picture signals $x_1 \sim x_3$ and applies a predictive value $\hat{x}_0$. On the other hand, the mode-3 decoding apparatus 66 receives the code input C coded in a linear predictive coding manner and decodes the same to a predictive error, that is, $(x_0-\hat{x}_0)$. Then, an arithmetic unit 70 receives the predictive value $\hat{x}_0$ and the decoded predictive error $(x_0-\hat{x}_0)$ and adds the same and hence applies the picture signal $x_0$ corresponding to the code input C.

Although, in the above described embodiments, $(d_0-w_2)$ or $(d_0-w_1)$ is coded in the mode 2 and a conventional linear predictive coding is made in the mode 3, the modes other than the mode 1 are not limited to the above described coding and hence other suitable coding method may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A redundancy reduction coding method of multi-tone picture signals, in which each of a plurality of multi-tone picture signals is indicative of a corresponding tone of each of a plurality of picture elements resolved from a picture, comprising the steps of selecting, as reference picture elements, a predetermined combination of picture elements from said picture elements already scanned and transmitted, a predetermined one of said reference picture elements being handled as a base reference picture element, evaluating a plurality of first tone level differences between the tone level of said base reference picture element and each of the tone levels of all of the reference picture elements other than said base reference picture element, said first tone level differences representing a plurality of picture states;

evaluating a second tone level difference between a tone level of an objective picture element to be transmitted and the tone level of said base reference picture element, responding to said plurality of first tone level differences and said second tone level difference to determine that a particular mode is mode-1 if the first level differences and second tone level differences are all included in a predetermined region and that a particular mode is a mode other than mode 1 if the first tone level differences and/or the second tone level difference are not included in the region, responding to said determination of the mode 1 to: (1) predict an order in which said second tone level difference appears for each of the plurality of picture states represented by the combination of said plurality of first tone level differences, (2) convert said second tone level difference into said predicted order, and (3) convert said predicted order into a predetermined assigned code, and responding to the determination of the mode other than said mode 1 to code the tone level of said objective picture element by means of a predetermined coding method appropriate for a mode other than mode-1.

2. A redundancy reduction coding method in accordance with claim 1, wherein said predetermined appropriate coding method comprises the steps of making a first determination of whether each of said plurality of first tone level difference is included in said predetermined region, making a second determination of whether said second tone level difference is included in said predetermined region, responding to a positive first determination and a negative second determination to convert said second tone level difference into a value which is not in said predetermined region, the value being the difference between tone level difference $(x_0-x_1)$ between an objective picture element and a base reference picture element, and a tone level of an upper limit or a lower limit of said predetermined region which is nearer to the tone level of said tone level difference, and to convert said value to a predetermined assigned code, and responding to said negative first determination to code the tone level of said objective picture element by means of a linear predictive coding method.

3. A redundancy reduction coding method in accordance with claim 1, wherein a predetermined code assigned to said predicted order is a variable length code in which a shorter code is assigned to a higher rank of said predicted orders.

4. A redundancy reduction coding method in accordance with claim 2, wherein a predetermined code assigned to said predicted order is a variable length code in which a shorter code is assigned to a higher rank of said predicted orders, a predetermined code assigned to said value is a variable length code in which a shorter code is assigned to the smaller value, and said predetermined code assigned to said predicted order is adapted not to be overlapped with the code assigned to said value.

5. A redundancy reduction coding method in accordance with claim 2, wherein a predetermined code assigned to said predicted order is a variable length code in which a shorter code is assigned to a higher rank of said predicted orders, a predetermined code assigned to said value is a variable length code in which a shorter code is assigned to the smaller value, a predetermined code assigned to said predicted order is the same as the code assigned to said value, and a mode identifying code is added to the top of said respective predetermined assigned codes.

6. A redundancy reduction coding apparatus of multi-tone picture signals, each of multi-tone picture signals indicating a corresponding tone of each of many picture elements resolved from a picture, comprising picture signal extracting means for delaying the picture signals of said picture elements already scanned and transmitted by a predetermined time period, so that a predetermined combination of picture elements is selected as reference picture elements from said picture elements already scanned and transmitted, a predetermined one of said reference picture elements being handled as a base reference picture element, first evaluating means for evaluating a plurality of first tone level differences between the tone level of said base reference picture element and each of the tone levels of said reference picture elements other than said base reference picture element, second evaluating means for evaluating a second tone level difference between a tone level of an objective picture element now to be transmitted and the tone level of said base reference picture element, region identifying means for identifying whether said plurality of first tone level differences and said second tone level difference are included in a predetermined region and applying an identifying signal, means for applying a first enabling signal in response to an identifying signal from said region identifying means indicating that said plurality of first tone level differences and said second tone level difference are all included in said predetermined region and for applying a second enabling signal in response to an identifying signal from said region identifying means indicating that said plurality of first tone level differences and/or said second tone level difference are not included in said predetermined region, code table means in which variable length codes are assigned by predicting an order in which the second tone level difference appears for each of a plurality of picture states represented by a combination of said plurality of first tone level differences, a shorter length of the code being assigned to the higher rank of said predicted orders, said code table means being enabled in response to said first enable signal and being responsive to said plurality of first tone level differences and said second tone level difference to apply said variable length code corresponding to said second tone level difference, and coding means responsive to said second enabling signal for coding the tone level of said objective picture element.

* * * * *